United States Patent [19]
Bellis, Jr.

[11] Patent Number: 6,053,339
[45] Date of Patent: Apr. 25, 2000

[54] TRAILER MOUNT FOR BACKPACK SPRAYER

[75] Inventor: William B. Bellis, Jr., Louisville, Ky.

[73] Assignee: Trimmer Trap, Inc., Louisville, Ky.

[21] Appl. No.: 09/304,380

[22] Filed: May 4, 1999

[51] Int. Cl.[7] .............................. A47F 7/00; A47H 1/16; A47B 97/00
[52] U.S. Cl. ...................... 211/70.6; 248/302; 248/503
[58] Field of Search ............................. 211/70.6, 89.01, 211/196, 204, 205; 248/503, 505, 302

[56] References Cited

U.S. PATENT DOCUMENTS

| | | |
|---|---|---|
| 867,996 | 10/1907 | McMillan . |
| 2,706,563 | 4/1955 | Larson ..................................... 211/204 |
| 3,432,133 | 3/1969 | Schmid . |
| 3,893,568 | 7/1975 | Lile . |
| 3,980,217 | 9/1976 | Yochum . |
| 4,027,798 | 6/1977 | Swaim . |
| 4,596,334 | 6/1986 | Daulton . |
| 4,805,781 | 2/1989 | Tegel . |
| 4,923,103 | 5/1990 | Sauber . |
| 5,361,611 | 11/1994 | Hisler . |
| 5,372,287 | 12/1994 | Deguevara . |
| 5,647,489 | 7/1997 | Bellis, Jr. . |

*Primary Examiner*—Daniel P. Stodola
*Assistant Examiner*—Erica B. Harris
*Attorney, Agent, or Firm*—Theresa Fritz Camoriano; Camoriano and Associates

[57] ABSTRACT

A mounting arrangement for mounting a backpack device on a trailer includes a beam with lateral projections and hooks on the ends of the projections to receive the frame of a backpack device. Preferably, there is at least one strap for securing the device in a vertical position on the mounting arrangement. To mount the device on the mounting arrangement, it is pivoted downwardly, to hook the device frame over the hooks, and is then pivoted upwardly, into a vertical position, and is secured in the vertical position so that it cannot pivot back down to come loose.

9 Claims, 7 Drawing Sheets

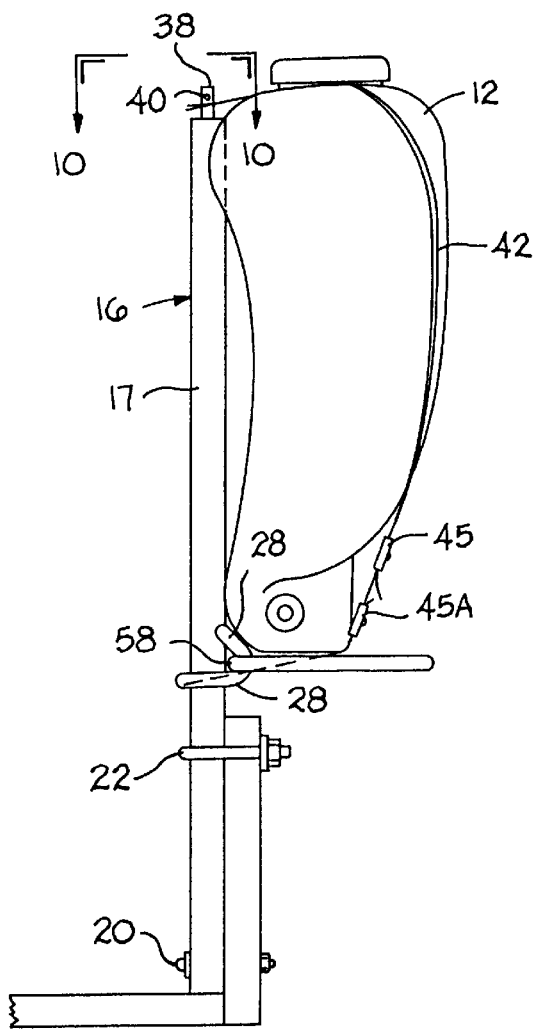
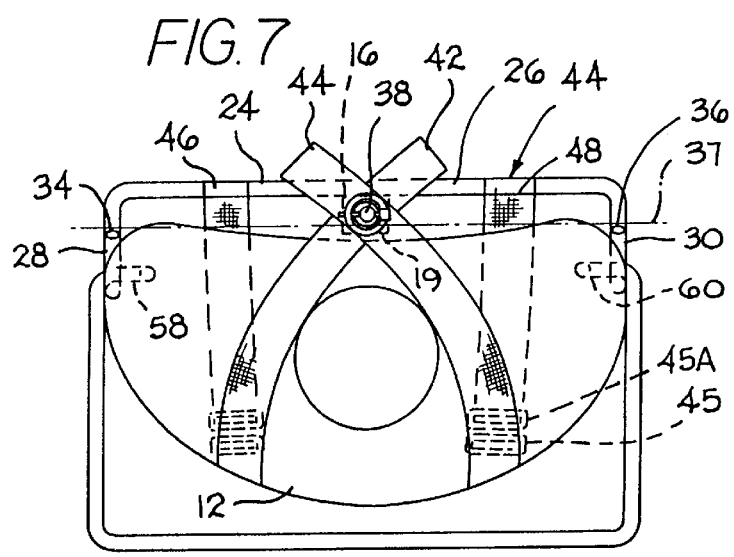

TRAILER MOUNT FOR BACKPACK SPRAYER

BACKGROUND OF THE INVENTION

The present invention relates to a mounting arrangement for mounting a backpack sprayer on a trailer. Most lawn care companies use a trailer to carry their equipment from place to place. The equipment is expensive, and it is in the interest of the lawn care companies to take good care of the equipment so that it functions properly on the job and so that it does not become damaged.

Usually, when the lawn care companies carry backpack sprayers, they simply throw the sprayer on the floor of their trailer or truck. Then, as they travel from job to job, the sprayer rolls around on the floor, bumping into lawn mowers, and so forth.

SUMMARY OF THE INVENTION

The present invention provides a secure mounting arrangement for mounting a backpack sprayer which prevents the backpack sprayer from rolling around and being damaged as it is carried from job to job.

The backpack sprayer mounting arrangement of the present invention includes a vertical beam, first and second hooked projections from the vertical beam for receiving the frame of the backpack sprayer, and a means for holding the sprayer in a vertical position on the vertical beam.

BRIEF DESCRIPTION OF THE DRAWINGS

FIG. 7 is the same view as FIG. 6, but with the straps secured at the top;

FIG. 8 is a top view of the mounted sprayer of FIGS. 1 and 7;

DESCRIPTION OF THE PREFERRED EMBODIMENTS

Figure 1:
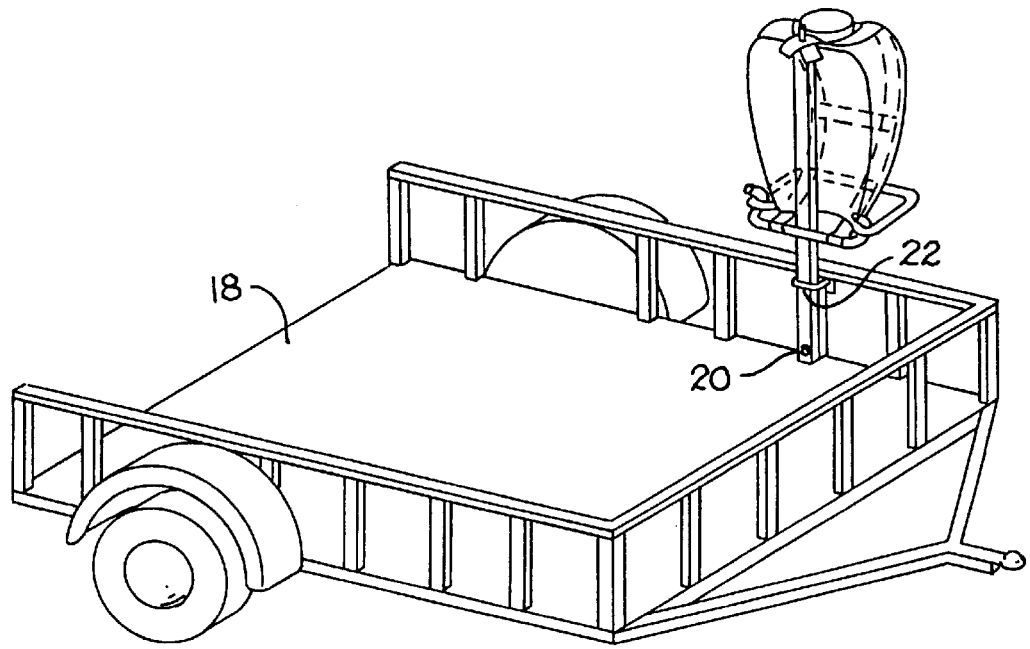
FIG. 1 is a rear perspective view of a backpack sprayer mounting arrangement made in accordance with the present invention and mounted on a trailer.
Figure 2:
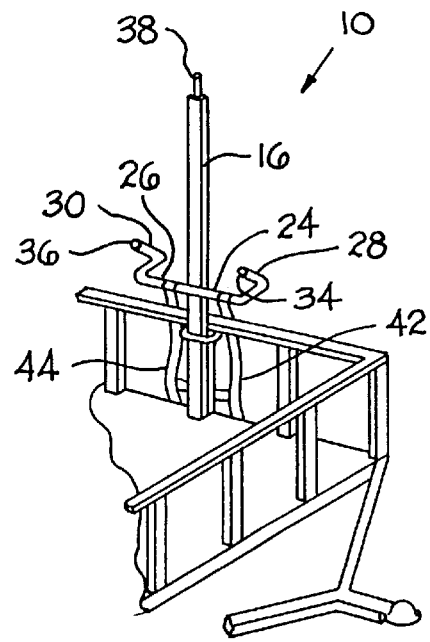
FIG. 2 is the same view as FIG. 1, but with the sprayer removed and the trailer partially broken away.
Figure 3:
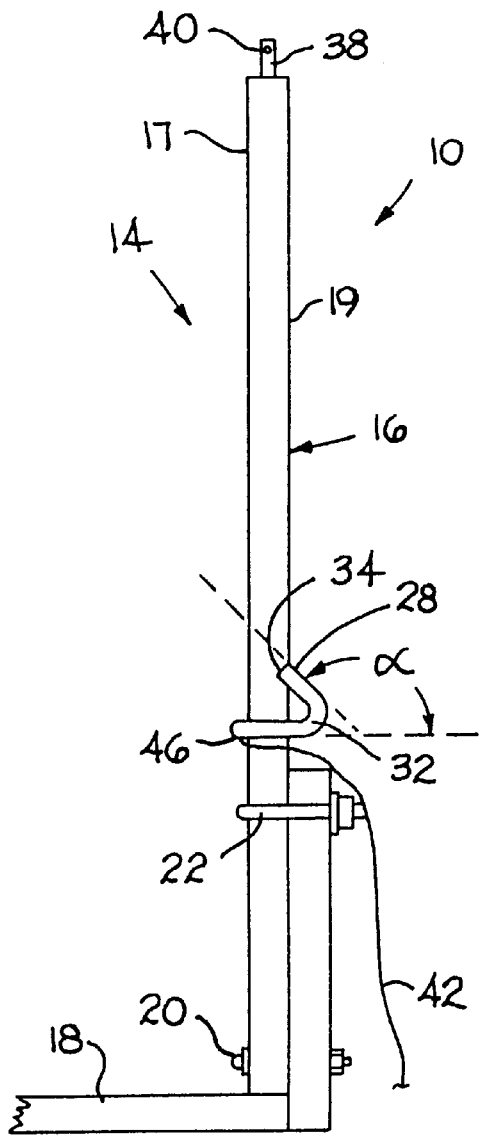
FIG. 3 is a side view of the mounting arrangement shown in FIG. 2.
Figure 4:
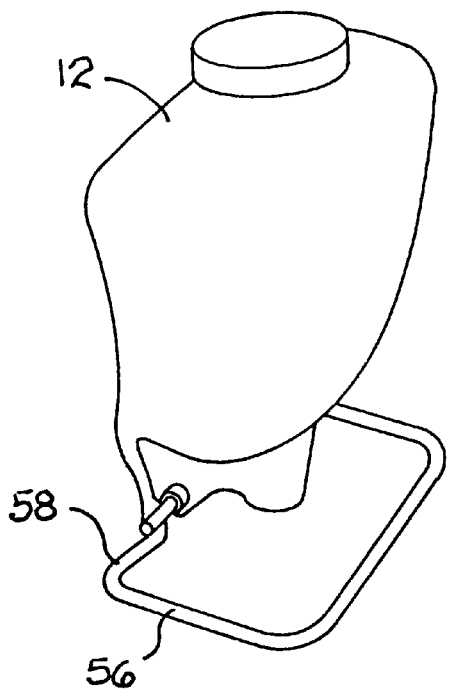
FIG. 4 is a front perspective view of the backpack sprayer of FIG. 1.
Figure 9:
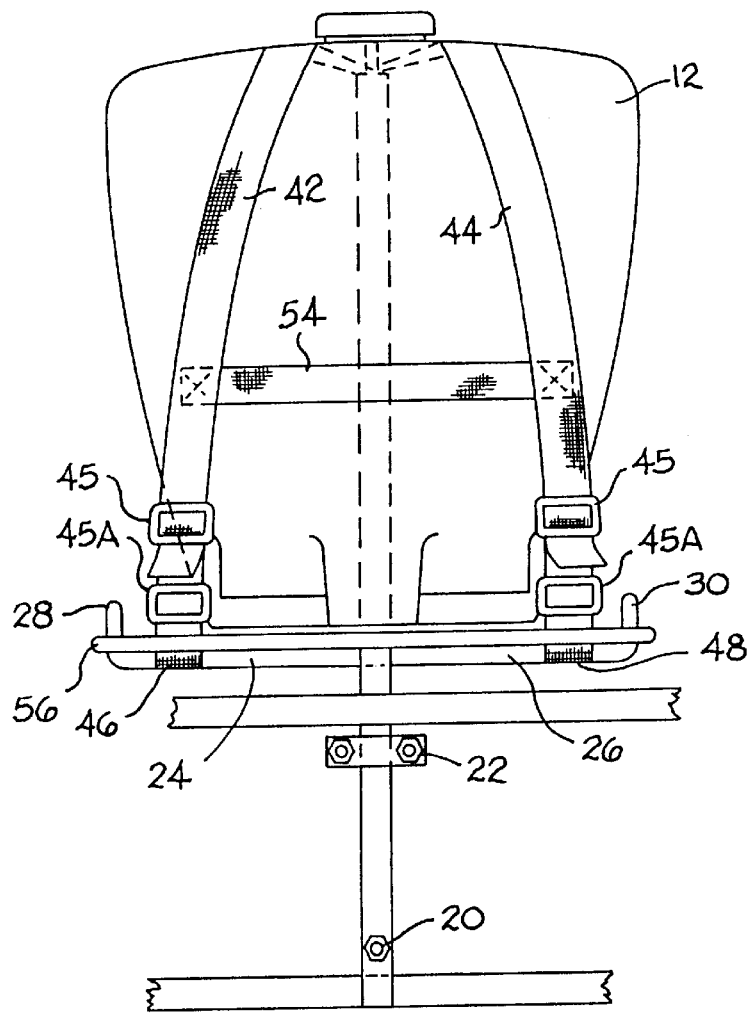
FIG. 9 is a front view of the mounted sprayer of FIG. 1.

FIGS. 1–10 show a preferred embodiment of a mounting arrangement 10 for a backpack sprayer 12 made in accordance with the present invention. In this embodiment, the mounting arrangement 10 is symmetrical about a vertical plane, so that the left side is a mirror image of the right side. As shown in FIGS. 2 and 3, the mounting arrangement 10 includes a mounting frame 14, which includes a vertical beam 16 that is fixed to the trailer 18 by means of a straight bolt 20 and a U-bolt 22. Left and right lateral projections 24, 26 extend from the beam 16 (as shown in FIG. 9). In this preferred embodiment, the lateral projections 24, 26 are made as a single unit that is welded to the beam 16, but they could be separate pieces, and they could be fixed to the beam 16 by bolting or by other known means. The lateral projections 24, 26 are slightly above the top of the trailer 18. At the free ends of the lateral projections 24, 26 are left and right hooks 28, 30, respectively. The lateral projections 24, 26 are mounted on the back side 17 of the beam 16, and the hooks 28, 30 extend forward, beyond the front side 19 of the beam 16 and wrap upward and backward through an angle a that is greater than 90° and preferably in the range of 110° to 180°, and most preferably in the range of 120° to 160°. It will be noted in FIGS. 3 and 8 that, while the fulcrum points 32 of the hooks 28, 30 are forward of the beam 16, the free ends 34, 36 of the hooks 28, 30 extend backwardly, so that an imaginary straight line 37 connecting the free ends 34, 36 lies behind the front 19 of the beam 16. The mounting frame 14 also includes an upper projection 38, which defines a through hole 40, that is used to fasten the straps, as is explained below.

Figure 10:
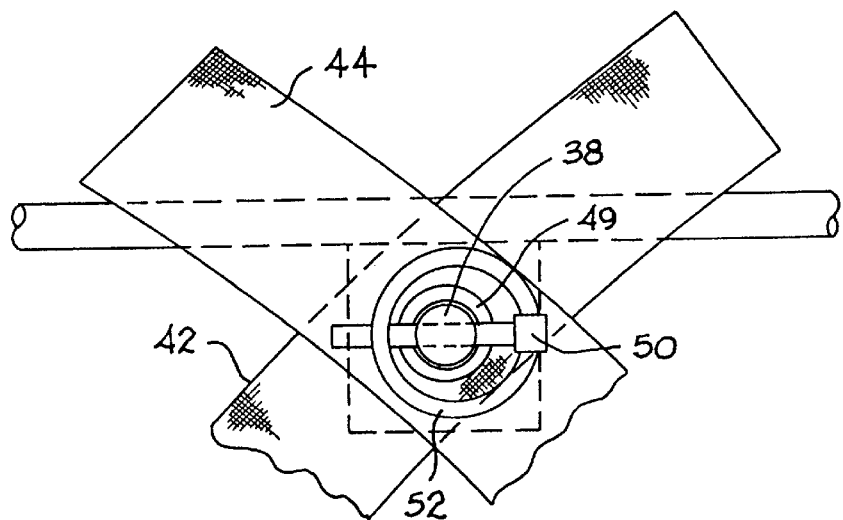
FIG. 10 is an enlarged, broken-away view taken along the line 10–10 of FIG. 7.

Mounted on the mounting frame 14 are left and right straps 42, 44. The fixed ends 46, 48 of the straps 42, 44 are wrapped around the respective lateral projections 24, 26 and are fastened in place by sewing or by buckles 45A. These straps 42, 44 are adjustable in length by means of buckles 45. As shown in FIG. 10, the free end of each strap 42, 44 has a grommet 49 surrounding a hole through the strap. When the backpack sprayer 12 is mounted on the mounting arrangement 10, the straps 42, 44 are wrapped over the front of the sprayer 12 and the grommets 49 are fitted over the upper projection 38. A pin 50 extends through the hole 40 in the projection 38 above the straps 42, 44, and a pivot ring 52, which extends through and pivots relative to the pin 50, extends over the upper projection 38, so that the pin 50 cannot accidentally come free from the upper projection 38. Other types of pins 50, such as a cotter pin, or a snap ring could be used instead, and other types of mounting arrangements, including snaps, hooks, buckles, hook-and-loop fasteners, and so forth could be used instead of the projection 38 and pin 50. Also, other types of straps could be used, such as bungee cords, ropes, or various other straps.

There is a cross-strap 54 (shown in FIG. 9), which extends between and is fastened to the left and right straps 42, 44. When the straps 42, 44 are fastened around the sprayer 12, the cross strap 54 is centrally located in the front of the sprayer 12.

FIGS. 5, 5A, 5B, 6, and 7 show the steps involved in mounting the sprayer 12 on the frame 14. First, it should be noted in FIG. 4, that the sprayer 12 has a base frame 56, which is standard in the industry. The base frame 56 is usually made of a formed metal rod and defines left and right lateral base frame portions 58, 60, which are received by the left and right hooks 28, 30, respectively.

Figure 5:
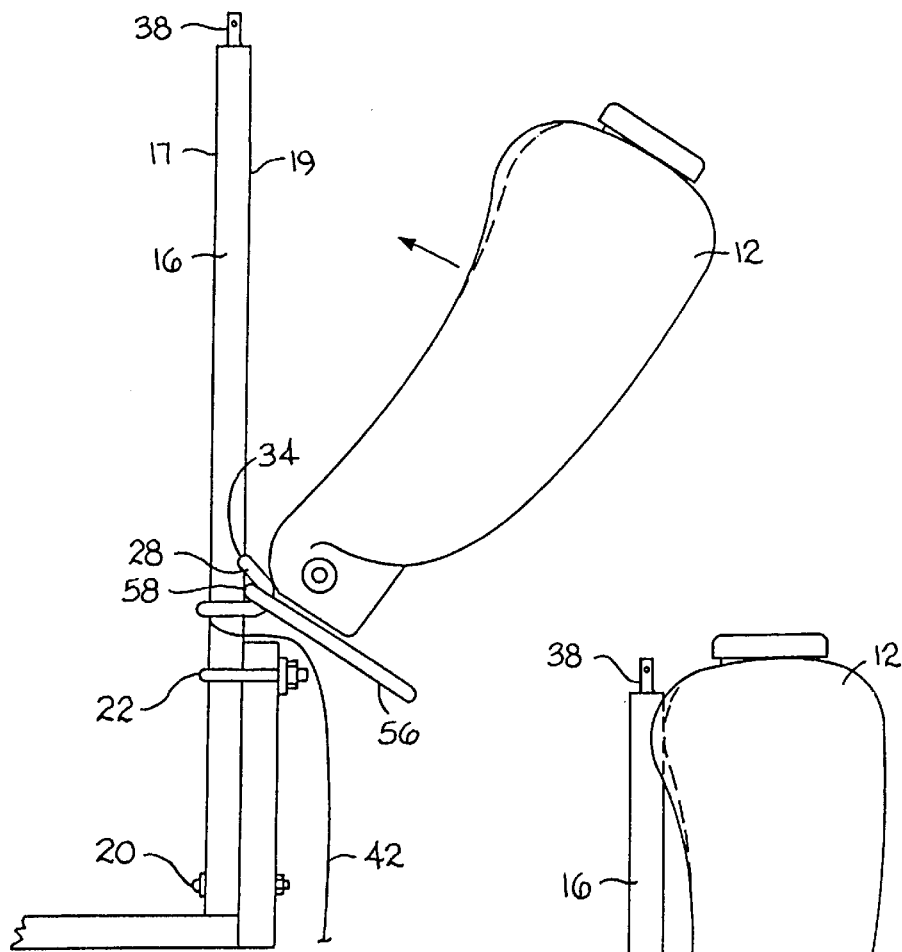
FIG. 5 is a side view, showing the backpack sprayer being mounted on the mounting arrangement of FIG. 1.
Figure 5A:
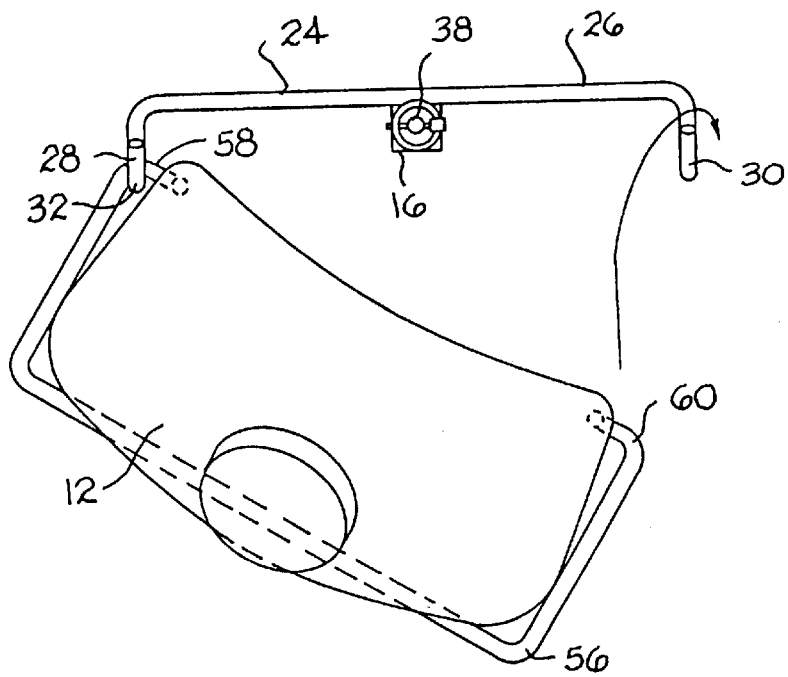
FIG. 5A is a top view, showing the backpack sprayer being mounted on the mounting arrangement of FIG. 1.
Figure 5B:
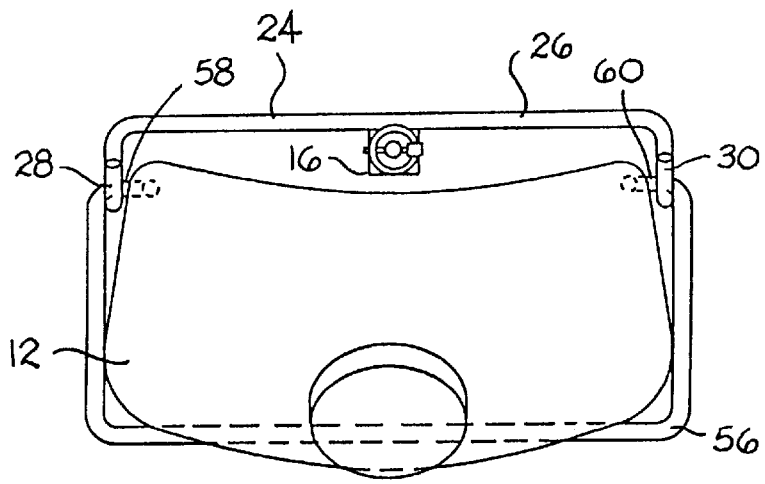
FIG. 5B is the same view as FIG. 5A, but with the sprayer further along in the mounting process.

In order to mount the base frame portions 58, 60 over the hooks 28, 30, the sprayer 12 is pivoted downwardly and forward to the position shown in FIG. 5. Even in this position, both frame portions 58, 60 cannot be mounted simultaneously, because the beam 16 interferes with the mounting. So, the person first puts one of the frame portions 58 over its respective hook 28, as shown in FIG. 5A, moving that portion forward to the respective fulcrum point 32, and then puts the other of the frame portions 60 over its respective hook 30, as shown in FIG. 5B.

Figure 6:
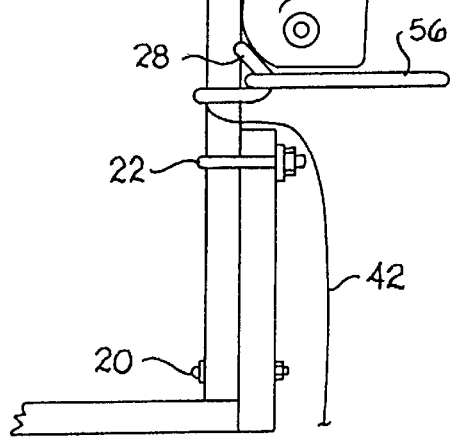
FIG. 6 is the same view as FIG. 5, but with the sprayer pivoted up, into contact with the beam.

Then, the sprayer 12 is pivoted upwardly as shown by the arrow in FIG. 5 until the upper and lower portions of the sprayer 12 abut the beam 16, as shown in FIG. 6. In this position, the base frame 56 cannot be removed from the hooks 28, 30. (The base frame 56 can only be removed from the hooks 28, 30 by pivoting it back down and rocking the sprayer first to one side to remove the base frame 56 from one hook and then to the other side to remove it from the other hook, reversing the process shown in FIGS. 5, 5A, and 5B.) Then, the straps 42, 44 are brought around the front of the sprayer 12, and the grommets 49 are dropped down over the upper projection 38. The pin 50 is inserted through the hole 40 over the straps 42, 44, and then the ring 52 is pivoted over the projection 38, to secure the pin in position. With the straps 42, 44 adjusted to the correct length for the sprayer 12, the straps 42, 44 hold the top of the sprayer 12 securely against the beam 16, so that the sprayer 12 cannot pivot back down to be removed without intentionally removing the pin 50 and releasing the straps 42, 44.

Figure 11:
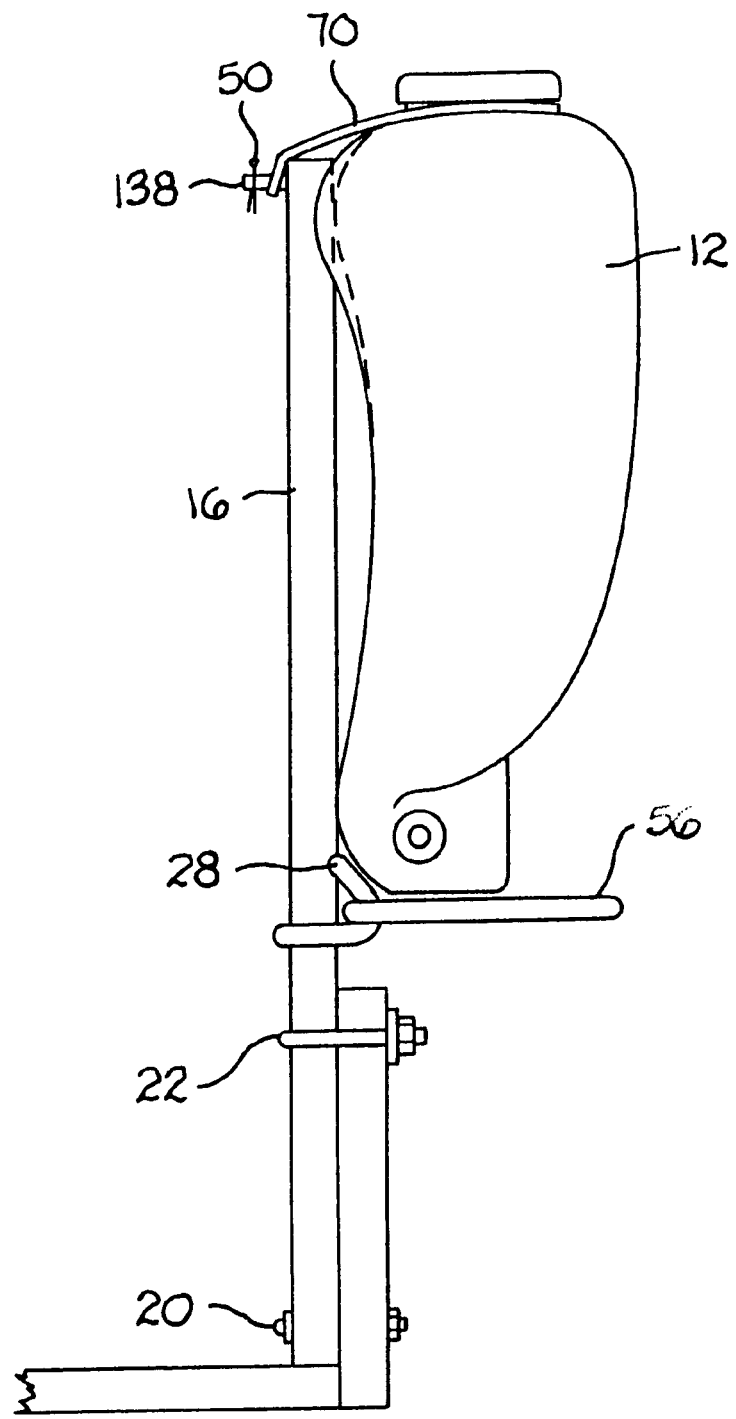
FIG. 11 is a side view of an alternative embodiment of a backpack mounting arrangement made in accordance with the present invention.

FIG. 11 shows an alternative embodiment, in which, instead of using the straps 42, 44 of the first embodiment, a single strap 70 is used to secure the upper portion of the sprayer 12 to the beam 16. In this case, instead of the vertical upper projection 38, there is a horizontal upper projection 138, which secures the ends of the strap 70 with a pin 50 and pivot ring 52, which mount in the same manner as the pin 50 and pivot ring 52 of the first embodiment. Again, it would be obvious to those skilled in the art that other types of straps and other types of securing means, such as hooks, snaps, and so forth, could be used.

While these preferred embodiments show the use of straps to secure the sprayer in the vertical position, it would also be possible to use other known mechanical means to prevent the sprayer from pivoting downwardly. For example, it would be possible to place one side of a hook-and-loop fastener on the upper back of the sprayer and the other side on the front of the beam 16 to retain the sprayer in a vertical position, or it would be possible to attach projections such as hooks to the upper portion of the sprayer and to provide corresponding receptacles, such as eyes, on the beam 16 to receive the projections, or to provide receptacles on the sprayer and corresponding projections on the beam. The sprayer itself has straps (not shown) which are used to mount the sprayer on a person's back, and it would be possible to provide hooks or other projections on the beam 16 that cooperate with those existing straps to hold the sprayer upright on the beam 16.

It will be obvious to those skilled in the art that modifications may be made to the embodiments described above without departing from the scope of the present invention.

What is claimed is:

1. A mounting arrangement for a backpack device having a base frame, comprising:

a mounting frame, including:

a vertical beam defining a front side;

left and right lateral projections from said vertical beam, each of said projections defining a free end; and left and right hooks on the free ends of said left and right lateral projections, respectively, said hooks defining fulcrum points that are forward of the vertical beam, and defining free ends that lie behind the front of the vertical beam.

2. A mounting arrangement for a backpack device having a base frame, as recited in claim 1, and further comprising means for maintaining the device in a vertical position on the mounting frame.

3. A mounting arrangement for a backpack device having a base frame, as recited in claim 2, wherein said means for maintaining comprises a strap; a projection from said vertical beam; and a pin extending through said projection, so that said strap is secured to the projection by the pin.

4. A mounting arrangement for a backpack device having a base frame, as recited in claim 2, wherein said means for maintaining comprises left and right straps mounted to said left and right lateral projections, and a cross-strap connecting said left and right straps together, and a projection on said vertical beam which receives the free ends of said straps.

5. A mounting arrangement for a backpack device having a base frame, as recited in claim 1, wherein said left and right hooks wrap around greater than 90° from the horizontal so that the backpack device cannot be removed from the hooks by simply lifting it vertically.

6. A mounting arrangement for a backpack device having a base frame, as recited in claim 1, and further comprising a U-bolt for mounting the vertical beam to a trailer.

7. A mounting arrangement for a backpack device having a base frame as recited in claim 1, and further comprising a backpack device mounted on said mounting frame, wherein said device includes a base frame, which is hooked over said left and right hooks.

8. A mounting arrangement for a backpack device having a base frame as recited in claim 1, and further comprising securing means for securing the upper portion of the device to the vertical beam so that the device cannot inadvertently pivot downwardly.

9. A method of mounting a backpack device, having a base frame, on a rack, comprising the steps of:

hooking the base frame of the device over a pair of hooks fixed to a vertical beam having a front side, said hooks defining fulcrum points that are forward of the vertical beam, and defining free ends that lie behind the front of the vertical beam;

rotating the device until an upper portion of the device contacts the beam; and securing the device to the beam in that rotated position so that it cannot unintentionally rotate back into a position in which the base frame can be removed from the hooks, thereby securing the device to the beam.

* * * * *